United States Patent
Chevion et al.

(10) Patent No.: US 7,333,658 B2
(45) Date of Patent: Feb. 19, 2008

(54) DATA VERIFICATION USING TEXT MESSAGING

(75) Inventors: Dan Chevion, Haifa (IL); Ehud Karnin, Koranit (IL); Yaakov Navon, Ein Vered (IL); Alexander Nisenboim, Kiryat Bialik (IL); Eugene Walach, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 639 days.

(21) Appl. No.: 10/978,958

(22) Filed: Nov. 1, 2004

(65) Prior Publication Data

US 2006/0093220 A1 May 4, 2006

(51) Int. Cl.
G06K 9/46 (2006.01)
G06F 15/16 (2006.01)
G06F 15/00 (2006.01)

(52) U.S. Cl. ............... 382/190; 709/203; 715/507

(58) Field of Classification Search ............ 382/137, 382/181, 186–187, 190, 209, 218, 311, 313, 382/321; 709/203; 715/507, 530, 541
See application file for complete search history.

(56) References Cited

U.S. PATENT DOCUMENTS

| | | | | |
|---|---|---|---|---|
| 5,768,509 A | * | 6/1998 | Gunluk | 709/203 |
| 5,832,100 A | * | 11/1998 | Lawton et al. | 382/100 |
| 6,600,482 B1 | * | 7/2003 | Leone et al. | 345/179 |
| 6,686,910 B2 | * | 2/2004 | O'Donnell, Jr. | 345/179 |
| 2003/0061188 A1 | * | 3/2003 | Wiebe et al. | 707/1 |
| 2004/0039731 A1 | * | 2/2004 | Levy | 707/3 |

* cited by examiner

Primary Examiner—Daniel Mariam

(57) ABSTRACT

A method for computerized processing of paper forms includes receiving an electronic image of a paper form containing text information from a client having a telephone. The text information is extracted from the form using an optical character recognition (OCR) process. A field of the extracted text information that is suspected of containing an error is identified, and a first text message is automatically communicated to the telephone asking the client to verify the identified field. A second text message is received in response to the first text message, and the text information in the field is validated or corrected according to the response.

18 Claims, 2 Drawing Sheets

DATA VERIFICATION USING TEXT MESSAGING

FIELD OF THE INVENTION

The present invention relates generally to automated data entry processes, and specifically to methods and systems enabling human intervention to inspect results and correct errors in such automated processes.

BACKGROUND OF THE INVENTION

Many types of organizations use paper forms to acquire data that is required to provide service and run their business. Examples range from banks that process large numbers of hand-written checks to government offices that receive and process typed or hand-written forms. These organizations typically run computerized databases and other computerized systems at the core of their business. They use automated systems to process large numbers of paper forms and convert them into computer-readable information. Several requirements are common to many such applications. The system must provide high throughput. The accuracy of translation from paper to computer database must be very high, while operating costs should be minimized.

Modern data entry procedures employ Optical Character Recognition (OCR) techniques to automate processing of form documents, referred to hereinafter as "forms." The accuracy of OCR is finite, resulting in a certain amount of conversion error. Many applications, such as check processing, cannot tolerate errors. In an effort to increase the conversion accuracy, various solutions and systems have been proposed for verification and elimination of errors. These verification solutions typically include human intervention, wherein a human operator is required to approve or correct "suspicious" information that is identified by the OCR system. The major drawback of human-based verification is its cost, and the impact of this cost on the total operating cost of the system.

Text messaging, in the form of Short Message Service (SMS) and its equivalents, has become widely available in virtually all mobile phone networks and many fixed public and private networks. Text messaging has gained wide popularity in recent years as a personal communication medium and as an enabling technology for a wide variety of automated services. An example of a system that uses SMS messaging as a method for providing feedback on computerized tasks can be found in PCT patent publication WO 02/054281 A2, whose disclosure is incorporated herein for reference.

SUMMARY OF THE INVENTION

Embodiments of the present invention that are described hereinbelow provide an accurate and cost-effective method of verifying results of automated Optical Character Recognition (OCR) systems, used for processing hand-written or typed forms. Verification is performed by requesting feedback from a client who filled out the form, using text messaging to and from his telephone.

The process of data entry and verification begins when a client fills out a paper form. An electronic image of this form is delivered to the organization that is to receive the data using any suitable delivery method, such as sending a fax or scanning the form. The electronic form is subsequently processed by an OCR-based system, to provide a computer-coded (typically ASCII) interpretation of the information that was filled into the form. This information is typically stored in a computer database or other electronic repository. During the conversion process, the OCR algorithm identifies and marks certain fields as "suspicious," i.e., suspected to contain coding errors. Instead of using a human operator within the organization for verifying the suspicious fields, embodiments of the present invention use the original client who filled the form for verifying, correcting and approving the computer-coded information. The verification and correction are typically accomplished by sending a text message, such as an SMS (Short Message Service) message, to the client's telephone. The client approves or edits the required information and sends a text response that is used to update the database.

In addition to providing an efficient method of correcting errors, embodiments of the present invention also provide assurance to clients that their information was received and entered correctly.

Information security is an issue that requires attention, in order to make sure that information is always received from an authorized source. Some embodiments of the present invention provide enhanced security through the use of caller-ID verification of the response message, by using a PIN (Personal Identification Number) to verify client identity, or both.

Some embodiments of the present invention may complement the use of SMS validation by alternative means, such as e-mail, fax or letter. This alternative verification may be required when the client does not allow the system to contact him using SMS, or does not respond to the message.

There is therefore provided, in accordance with an embodiment of the present invention, a method for computerized processing of paper forms, including:

receiving an electronic image of a paper form containing text information from a client having a telephone;

extracting the text information from the form using an optical character recognition (OCR)-process;

identifying a field of the extracted text information that is suspected of containing an error;

automatically communicating a first text message to the telephone asking the client to verify the identified field; and receiving a second text message in response to the first text message, and validating or correcting the text information in the field according to the response.

In disclosed embodiments, receiving the electronic image includes receiving a graphical electronic version of the form over a communication line. In some embodiments, communicating the first text message to the client includes sending the first text message using a Short Message Service (SMS) over a wireless cellular telephone network. In one embodiment, communicating the first text message includes determining whether the client has authorized being contacted by text messaging, and sending the first text message only if authorized by the client. In another embodiment, receiving the second text message includes verifying an identity of the client before validating or correcting the text information. In still another embodiment, extracting the text information includes extracting a telephone number from the form, and communicating the first text message includes sending the first text message to the extracted telephone number.

There is also provided, in accordance with an embodiment of the present invention, apparatus for computerized processing of paper forms, including:

an OCR processor, which is coupled to receive an electronic image of a paper form containing text information from a client having a telephone, and is arranged to extract the text information from the form using an optical character recognition (OCR) process and to identify a field of the extracted text information that is suspected of containing an error; and a data validation processor, which is arranged to automatically communicate a first text message to the telephone asking the client to verify the identified field, and upon receiving a second text message in response to the first text message, to validate or correct the text information in the field according to the response.

There is additionally provided, in accordance with an embodiment of the present invention, a computer software product, for processing of text information that has been extracted using an optical character recognition (OCR) process from a paper form containing the text information that has been received from a client having a telephone, the product including a computer-readable medium in which program instructions are stored, which instructions, when read by the computer, cause the computer to identify a field of the extracted text information that is suspected of containing an error, to automatically communicate a first text message to the telephone asking the client to verify the identified field, and upon receiving a second text message in response to the first text message, to validate or correct the text information in the field according to the response.

The present invention will be more fully understood from the following detailed description of the embodiments thereof, taken together with the drawings in which:

DETAILED DESCRIPTION OF EMBODIMENTS

Figure 1:
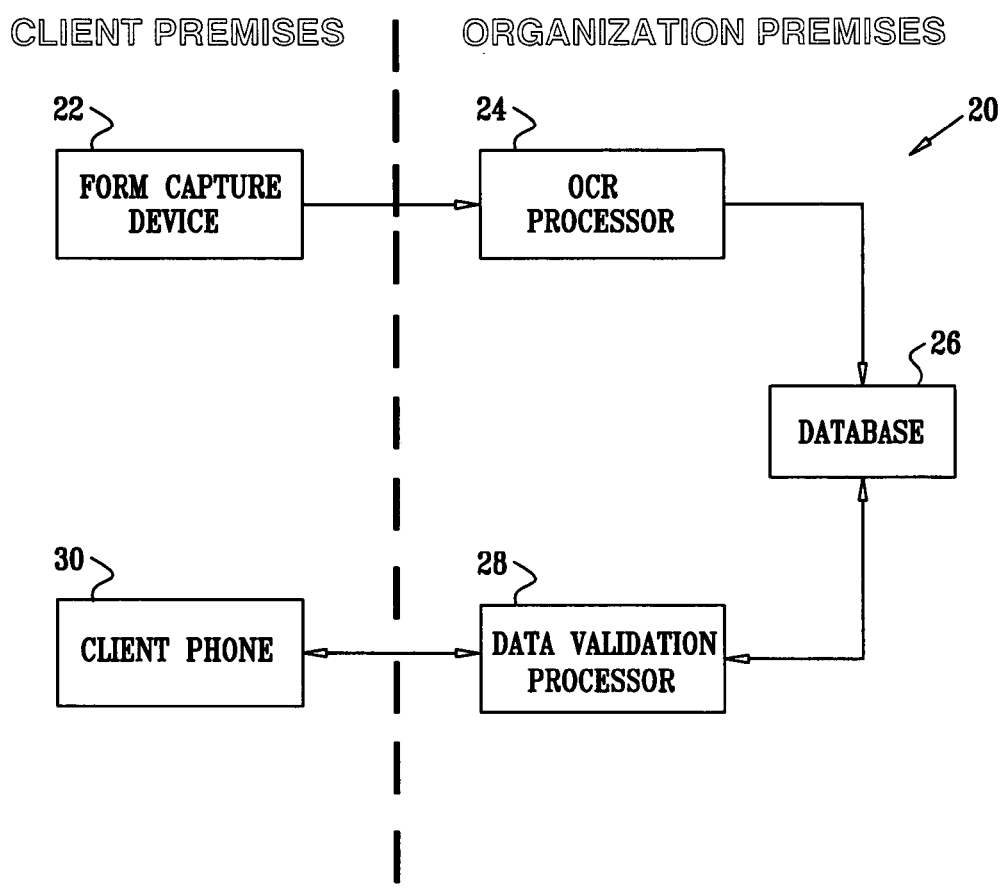
FIG. 1 is a schematic block diagram of apparatus for data entry and verification, in accordance with an embodiment of the present invention.

FIG. 1 is a schematic block diagram of apparatus 20 for data entry and verification, in accordance with an embodiment of the present invention. A paper form, in which data have been hand-written or typed, is captured and converted to electronic graphic format using a form capture device 22, typically a fax machine or document scanner. The graphical electronic version of the form is delivered over a communication line to the premises of an organization that is to receive the data, where the form is processed by an OCR processor 24. The OCR algorithm employed by OCR processor 24 recognizes the hand-written or typed text characters in the form and converts them to a coded text (typically ASCII) representation. This representation is stored in a repository, such as a database 26.

During the conversion process, the OCR algorithm identifies and marks certain information fields as "suspicious," i.e., suspected of containing coding errors. Various methods are known in the art for assessing the confidence level of OCR coding, and any suitable method may be used in deciding which fields contain suspicious information. Suspicious information is handled by a data validation processor 28. Typically, OCR processor 24 and data validation processor 28 comprise general-purpose computers, which are programmed in software to carry out the functions described herein. This software may be downloaded to the processors in electronic form, over a network, for example, or it may alternatively be furnished on tangible media, such as optical, magnetic or non-volatile electronic memory. Although processors 24 and 28 are shown, for the sake of conceptual clarity, as separate entities, both the OCR and validation functions described herein may be carried out by the same computer. Alternatively, for increased throughput, at least some of the OCR and/or validation functions may be performed by dedicated hardware.

Upon receiving a suspicious field for verification, data validation processor 28 constructs a simple text query to be sent to the client. For example, assume that OCR processor 24 processed a form sent by Mr. John Doe, but misinterpreted his last name as "Doc." After checking this field against a list of known last names, OCR processor 24 decides that this information is suspected of being erroneous. Provided the client has authorized contacting him by text messaging, data validation processor 28 constructs the text message "Last name=Doc?" This text message is sent to a telephone 30 belonging to the client. (The client has the option of declining the use of text messaging for validation and authorizing alternative means, such as fax, e-mail or letter.) Typically, telephone 30 is a mobile telephone, and data validation processor 28 sends the message via an SMS-gateway and a cellular telephone network (not shown). Alternatively, the text message may be sent to other types of telephones (not necessarily mobile) via other types of telephone networks, such as a public switched telephone network (PSTN), as long as the telephone and network support text messaging. In order to contact the client, data validation processor 28 must have access to the client's telephone number. In some embodiments this telephone number may be one of the information fields filled out by the client in the original paper form. In other embodiments the number may be known in advance or obtained using other means.

The client receives the query on phone 30 and has the option of approving or editing the information. After editing as needed, the client replies to the SMS message by transmitting another SMS message back to data validation processor 28. The reply message may indicate that the field presented in the original message was correct, or it may contain corrected data entered by the client (Alternatively, the reply may be in the form of a short voice confirmation.) Data validation processor 28 receives the returned SMS message and typically verifies the client's identity. Identity verification may be performed using the caller-ID information contained in the SMS message, or by using a predetermined PIN (personal Identity Number) entered by the client in the reply message, or both. Once the sender's identity has been verified, data validation processor 28 extracts the validated information field from the message and stores the correct information in database 26.

Figure 2:
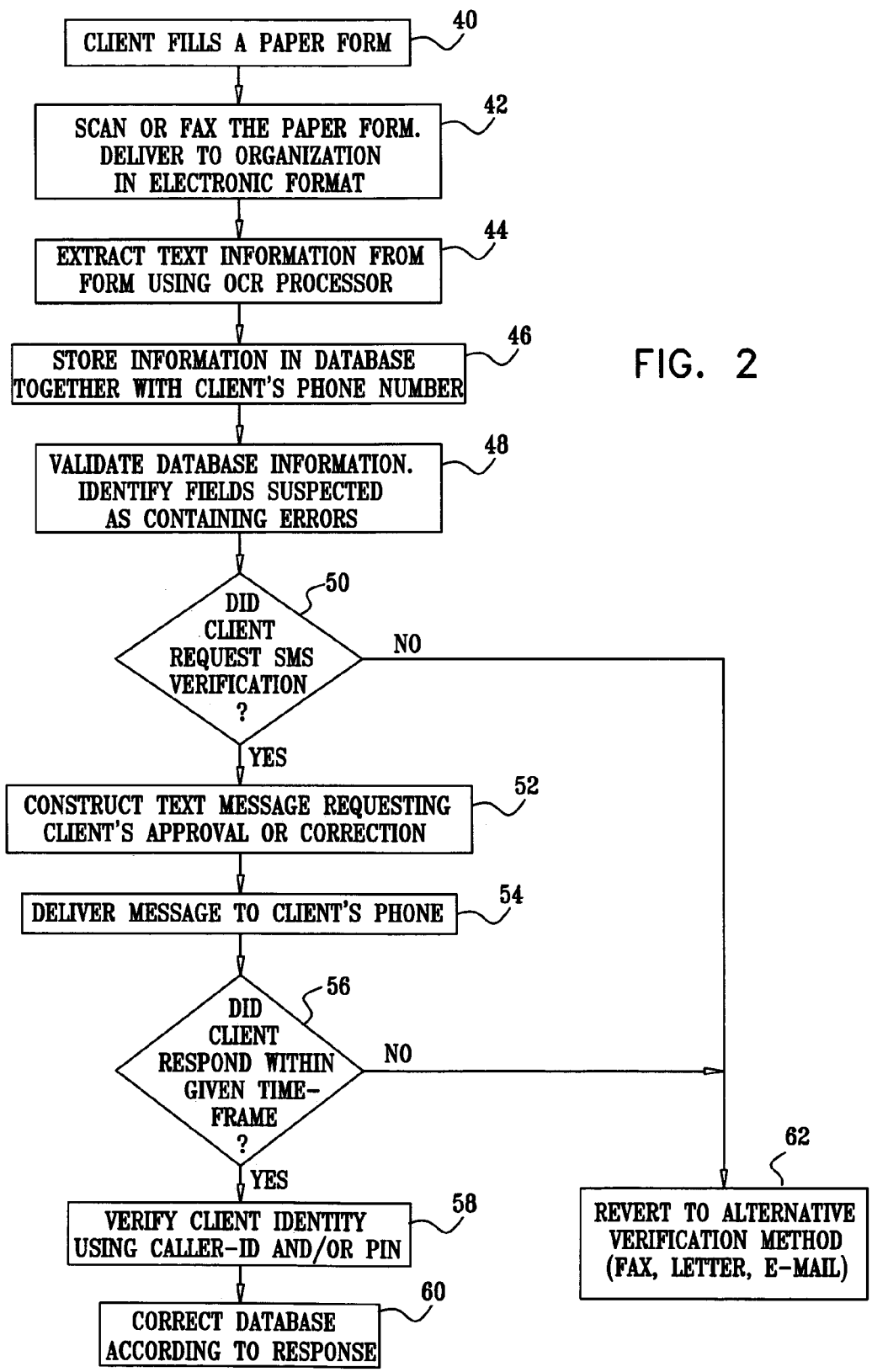
FIG. 2 is a flow chart that schematically illustrates a method for data entry and verification, in accordance with an embodiment of the present invention.

FIG. 2 is a flow chart that schematically illustrates a method for data entry and verification using apparatus 20, in accordance with one embodiment of the present invention. The method is initiated when the client fills out a paper form with information to be submitted to a given organization, at a form completion step 40. The client then submits the form to the organization electronically, at a submission step 42. For example, the client may fax the form to the organization fax number, or may alternatively scan the form and send the scanned image by e-mail. OCR processor 24 extracts text information from the form at data extraction step 44. The information extracted from the form is stored in database 26 at storage step 46. The client's telephone number may be stored as part of the information in database 26, to be used later for generating a text message for verification, if necessary.

OCR processor 24 analyzes the information and identifies suspicious fields requiring client validation at validation step 48. A listing of these suspicious fields is passed to validation processor 28, which then checks whether the client has authorized contacting him using text messaging for verification at an authorization step 50. If authorized, data validation processor 28 reads the information to be verified from database 26 and constructs a text query, at a message construction step 52. Processor 28 then delivers the message to the client's telephone 30 via a suitable text messaging gateway, at a message delivery step 54. The data validation processor waits for the client to respond to the text message, at a waiting step 56.

If a response is received from the client within a predetermined time limit, data validation processor 28 verifies the client's identity at an identity verification step 58. Processor 28 then updates database 26 with the corrected (or verified) information, at database updating step 60. If either the client did not allow text messaging verification at step 50 or did not respond to the message at step 56, system 20 reverts to alternative verification methods, such as e-mail, fax or letter, at an alternative delivery step 62.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for computerized processing of paper forms, comprising:
   receiving an electronic image of a paper form containing text information from a client having a telephone;
   extracting the text information from the form using an optical character recognition (OCR) process;
   identifying a field of the extracted text information that is suspected of containing an error;
   automatically communicating a first text message to the telephone asking the client to verify the identified field; and
   receiving a second text message in response to the first text message, and validating or correcting the text information in the field according to the response.

2. The method according to claim 1, wherein receiving the electronic image comprises receiving a graphical electronic version of the form over a communication line.

3. The method according to claim 1, wherein communicating the first text message to the client comprises sending the first text message using a Short Message Service (SMS) over a wireless cellular telephone network.

4. The method according to claim 1, wherein communicating the first text message comprises determining whether the client has authorized being contacted by text messaging, and sending the first text message only if authorized by the client.

5. The method according to claim 1, wherein receiving the second text message comprises verifying an identity of the client before validating or correcting the text information.

6. The method according to claim 1, wherein extracting the text information comprises extracting a telephone number from the form, and wherein communicating the first text message comprises sending the first text message to the extracted telephone number.

7. Apparatus for computerized processing of paper forms, comprising:

an OCR processor, which is coupled to receive an electronic image of a paper form containing text information from a client having a telephone, and is arranged to extract the text information from the form using an optical character recognition (OCR) process and to identify a field of the extracted text information that is suspected of containing an error; and a data validation processor, which is arranged to automatically communicate a first text message to the telephone asking the client to verify the identified field, and upon receiving a second text message in response to the first text message, to validate or correct the text information in the field according to the response.

8. The apparatus according to claim 7, wherein the OCR processor is coupled to receive the electronic image over a communication line.

9. The apparatus according to claim 7, wherein the data validation processor is coupled to send the first text message using a Short Message Service (SMS) over a wireless cellular telephone network.

10. The apparatus according to claim 7, wherein the data validation processor is arranged to determine whether the client has authorized being contacted by text messaging, and to send the first text message only if authorized by the client.

11. The apparatus according to claim 7, wherein the data validation processor is arranged to verify an identity of the client responsively to the second text message before validating or correcting the text information.

12. The apparatus according to claim 7, wherein the OCR processor is arranged to extract a telephone number from the form, and wherein the data validation processor is arranged to send the first text message to the extracted telephone number.

13. A computer software product, for processing of text information that has been extracted using an optical character recognition (OCR) process from a paper form containing the text information that has been received from a client having a telephone, the product comprising a computer-readable medium in which program instructions are stored, which instructions, when read by the computer, cause the computer to identify a field of the extracted text information that is suspected of containing an error, to automatically communicate a first text message to the telephone asking the client to verify the identified field, and upon receiving a second text message in response to the first text message, to validate or correct the text information in the field according to the response.

14. The product according to claim 13, wherein the electronic image is received from the client over a communication line.

15. The product according to claim 13, wherein the instructions cause the computer to send the first text message to the client using a Short Message Service (SMS) over a wireless cellular telephone network.

16. The product according to claim 13, wherein the instructions cause the computer to determine whether the client has authorized being contacted by text messaging, and to send the first text message only if authorized by the client.

17. The product according to claim 13, wherein the instructions cause the computer to verify an identity of the client responsively to the second text message before validating or correcting the text information.

18. The product according to claim 13, wherein the instructions cause the computer to extract a telephone number from the form and to send the first text message to the extracted telephone number.

\* \* \* \* \*